(12) United States Patent
Dahman et al.

(10) Patent No.: US 6,711,580 B2
(45) Date of Patent: Mar. 23, 2004

(54) DATA MANAGEMENT SYSTEM, APPARATUS, AND METHOD TO USE BUFFERED FILE MARKS

(75) Inventors: Kirby Grant Dahman, Tucson, AZ (US); Kathryn Eileen Eldred, Tucson, AZ (US); Gavin Stuart Johnson, Aromas, CA (US); Jon Arthur Lynds, San Jose, CA (US); Wayne Erwin Rhoten, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 09/968,452

(22) Filed: Oct. 1, 2001

(65) Prior Publication Data

US 2003/0065881 A1 Apr. 3, 2003

(51) Int. Cl.$^7$ ................................................ R06F 17/30
(52) U.S. Cl. ........................................ 707/102; 707/101
(58) Field of Search ................................ 707/101, 102, 707/204; 360/72.2; 710/6, 61, 100; 711/4, 112, 113

(56) References Cited

PUBLICATIONS

IBM, DFSMS/MVS Version 1 Release 4, GC26–4900–05, General Information, 1980, pp. 1–167.

*Primary Examiner*—Diane D. Mizrahi
*Assistant Examiner*—Apu Mofiz
(74) *Attorney, Agent, or Firm*—Dale F. Regelman (57) ABSTRACT

A method to record information on a data storage medium using buffered tape marks. A data storage device comprising a computer useable medium having computer readable program code disposed therein for implementing Applicants' method to record information on a data storage medium using buffered tape marks. A data storage and retrieval system comprising a computer useable medium having computer readable program code disposed therein for implementing Applicants' method to record information on a data storage medium using buffered tape marks. Computer program products embodied as program code stored in one or more memory devices, such as a magnetic disk, a magnetic tape, or other non-volatile memory device disposed in a host computer, a data storage device, and/or a library controller.

9 Claims, 14 Drawing Sheets

DATA MANAGEMENT SYSTEM, APPARATUS, AND METHOD TO USE BUFFERED FILE MARKS

FIELD OF THE INVENTION

Applicant's invention relates to an apparatus and method to record information on a data storage medium using buffered file marks.

BACKGROUND OF THE INVENTION

Automated media storage libraries are known for providing cost effective access to large quantities of stored media. Generally, media storage libraries include a large number of storage slots in which are stored data storage media. The portable data storage media are typically housed in a portable container, such as a tape cartridge, an optical cartridge, and the like. One (or more) accessors typically access the data storage media from the storage slots and deliver the accessed media to a data storage drive for reading and/or writing data on the accessed media. Suitable electronics operate the accessor(s) and operate the data storage drive(s) to transmit to, and/or to receive data from, an attached on-line host computer system.

In a conventional automated media storage library, the storage slots are arranged in a planar orthogonal arrangement forming a "wall" of storage slots for holding data storage media. The plane may be a flat plane, or may be a cylindrical plane. To double the storage capacity, two "walls" of storage slots may be provided on either side of the accessor.

A number of different companies manufacture automated media storage libraries today, each model displaying various different features. One example is the IBM 3494 Media Storage Library. Some of the automated media storage libraries have dual or multiple accessors to provide a level of redundancy and/or improved performance.

What is needed, however, is a data management system, method, and apparatus and method to expedite the recording of information provided by a host computer onto a data storage medium, particularly where that information comprises a plurality of individual files.

SUMMARY OF THE INVENTION

Applicants' invention includes a method to dispose information on a sequential medium, such as a tape, using buffered tape marks. Applicants' method includes the steps of providing information from a host computer to a tape library, where that information includes one or more tape marks, storing that information in one or more memory buffers, and transferring that information from those one or more memory buffers to a data storage medium.

Applicants' invention further includes a data storage device which includes a computer useable medium having computer readable program code disposed therein for disposing information on a data storage medium using buffered tape marks. Applicants' invention further includes a data storage and retrieval system comprising a computer useable medium having computer readable program code disposed therein for disposing information on a data storage medium using buffered tape marks.

Applicants' invention further includes a computer program product usable with a programmable computer processor having computer readable program code embodied therein for disposing information on a tape medium using buffered tape marks.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the figures. The invention will be described as embodied in an automated data storage and retrieval subsystem for use in a data processing environment. The following description of Applicant's method to record information to a movable tape medium, or to a movable tape medium disposed within a portable data storage cartridge is not meant, however, to limit Applicant's invention to either data storage and retrieval systems, or to magnetic tape applications, as the invention herein can be applied to data storage media in general.

Figure 3:
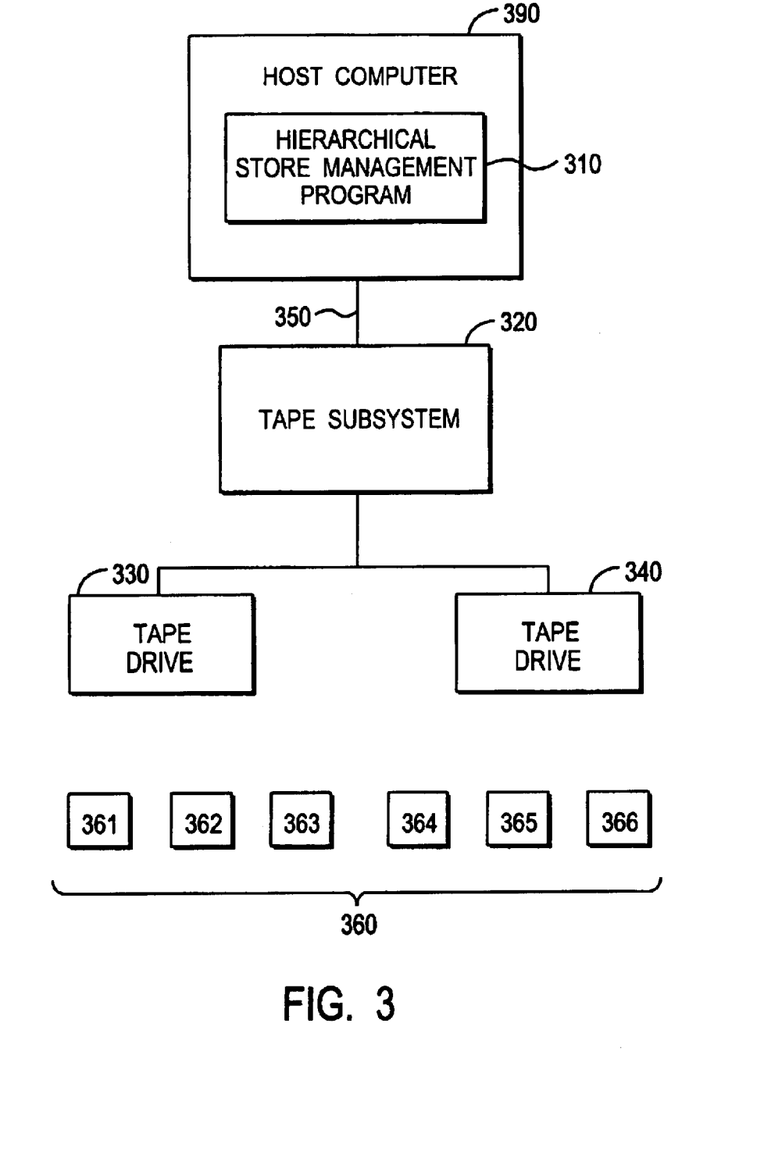
FIG. 3 is block diagram showing the components of Applicants' data storage and retrieval system.

FIG. 3 illustrates the hardware and software environment in which preferred embodiments of the present invention are implemented. Host system 390 includes Applicants' hierarchical storage management (HSM) program 310. Host computer 390 can comprises one or more mainframe computers, one or more personal computers, and combinations thereof.

Information is transferred between the host system 390 and secondary storage devices managed by a data storage and retrieval system, such as tape subsystem 320, via communication link 350. Communication link 350 comprises a serial interconnection, such as an RS-232 cable or an RS-432 cable, an ethernet interconnection, a SCSI interconnection, a Fiber Channel interconnection, an ESCON network, a FICON network, a Local Area Network (LAN), a private Wide Area Network (WAN), a public wide area network, Storage Area Network (SAN), Transmission Control Protocol/Internet Protocol (TCP/IP), the Internet, and combinations thereof.

In the embodiment shown in FIG. 3, tape subsystem 320 includes tape drives 330 and 340. In other embodiments of Applicants' data storage and retrieval system, tape subsystem 320 includes a single data storage drive. In alternative embodiments, Applicants' data storage and retrieval system 320 includes more than two data storage drives.

A plurality of portable data storage media 360 are stored within Applicants' data storage and retrieval system. In certain embodiments, plurality of data storage media 360 are each housed in a portable data storage cartridge 370, such as plurality of portable tape cartridges 370 (not shown in FIG. 3). Each of such portable data storage cartridges may be inserted in one of tape drives, and thereafter accessed by the tape subsystem 320. In alternative embodiments, alternative storage media may be substituted for the tape cartridges 370. Any type of non-volatile sequential media supporting a sequential access command architecture could be used.

The tape subsystem 320 further includes program logic to manage tape drives 330 and 340, and plurality of tape cartridges 370. In alternative embodiments, tape subsystem 330 and host system 390 may be located on a single computer machine.

Host system 390 comprises a computer system, such as a mainframe, personal computer, workstation, etc., including an operating system such as Windows, AIX, Unix, MVS, etc. (Windows is a registered trademark of Microsoft Corporation; AIX is a registered trademark and MVS is a trademark of IBM Corporation; and UNIX is a registered trademark in the United States and other countries licensed exclusively through The Open Group.) The HSM program 310 in the host system 390 may include the functionality of HSM type programs known in the art that manage the transfer of data to a tape library, such as the IBM DFSMS implemented in the IBM MVS operating system.

The IBM DFSMS software is described in "DFSMS/MVS V1R4 General Information," IBM document no. GC26-4900-05, published by IBM (Copyright 1997, IBM), which publication is incorporated herein by reference in its entirety. In addition to including known HSM functions, such as recall and migration, the HSM program 310 would further include additional program instructions to perform the operations of the preferred embodiments of the present invention. The HSM program 310 may be implemented within the operating system of the host system 390 or as a separate, installed application program.

The tape subsystem 320 comprises a computer system, and manages a plurality of tape drives and tape cartridges. The tape drives 330 and 340 may be any suitable tape drives known in the art, e.g., the Magstar 3590 tape drives. Tape cartridges 370 may be any suitable tape cartridge device known in the art, (Magstar is a registered trademark of IBM Corporation) such as ECCST, Magstar, IBM 3420, 3480, 3490E, 3590 tape cartridges, etc. The tape subsystem 320 may be a manual tape library in which the user must manually mount tape cartridges 370 into the tape drives 330/340, or an automated tape library (ATL) in which a robotic arm mounts tape cartridges 370 in the library into the tape drives 330/340.

Figure 1:
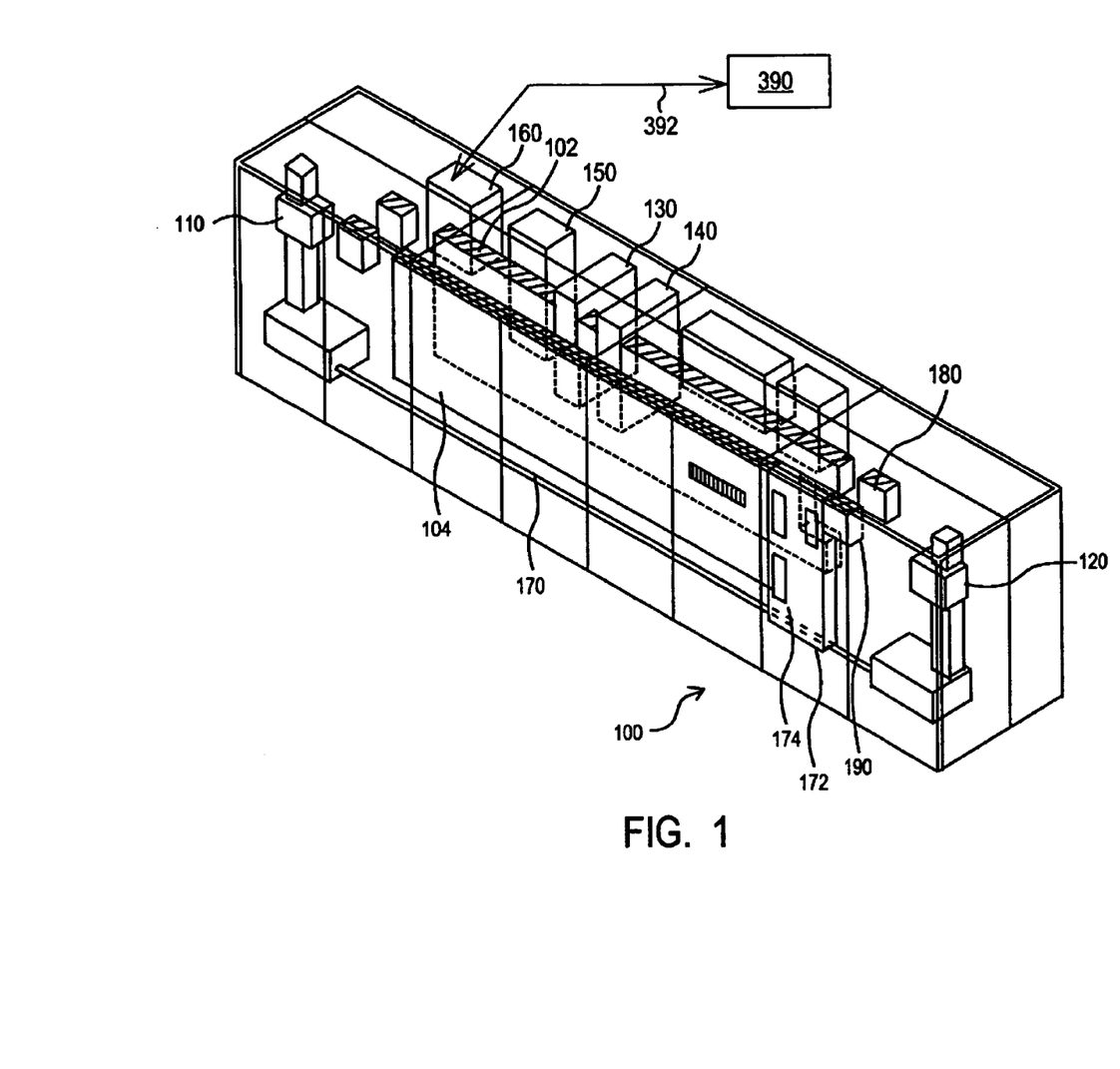
FIG. 1 is a perspective view of a first embodiment of Applicants' data storage and retrieval system.

For example referring now to FIG. 1, automated data storage and retrieval system 100 is shown having a first wall of storage slots 102 and a second wall of storage slots 104. Portable data storage cartridges, such as tape cartridges 370, are individually stored in these storage slots.

Data storage and retrieval system 100 includes one or more accessors, such as accessors 110 and 120. An accessor is a robotic device which accesses portable data storage media from first storage wall 102 or second storage wall 104, delivers that accessed media to data storage devices 130/140 for reading and/or writing data thereon, and returns the media to the proper storage slot.

Figure 2A:
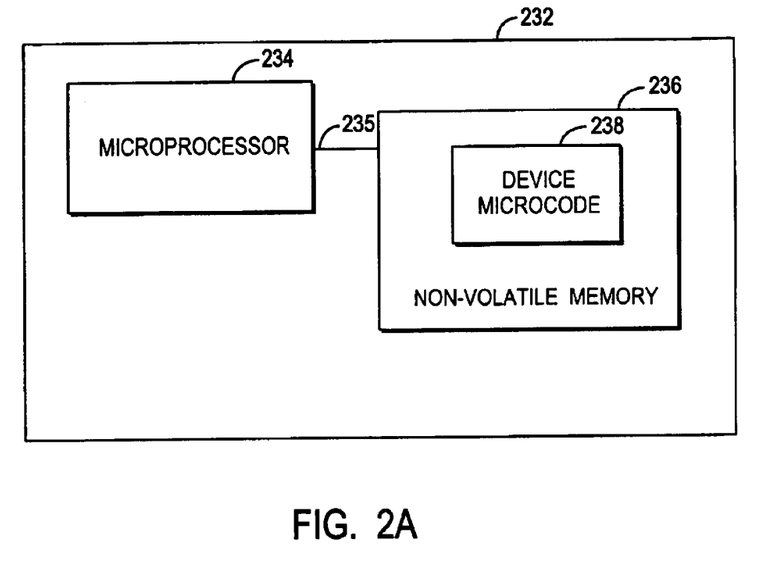
FIG. 2A is a block diagram of a controller disposed in Applicants' data storage device.
Figure 4:
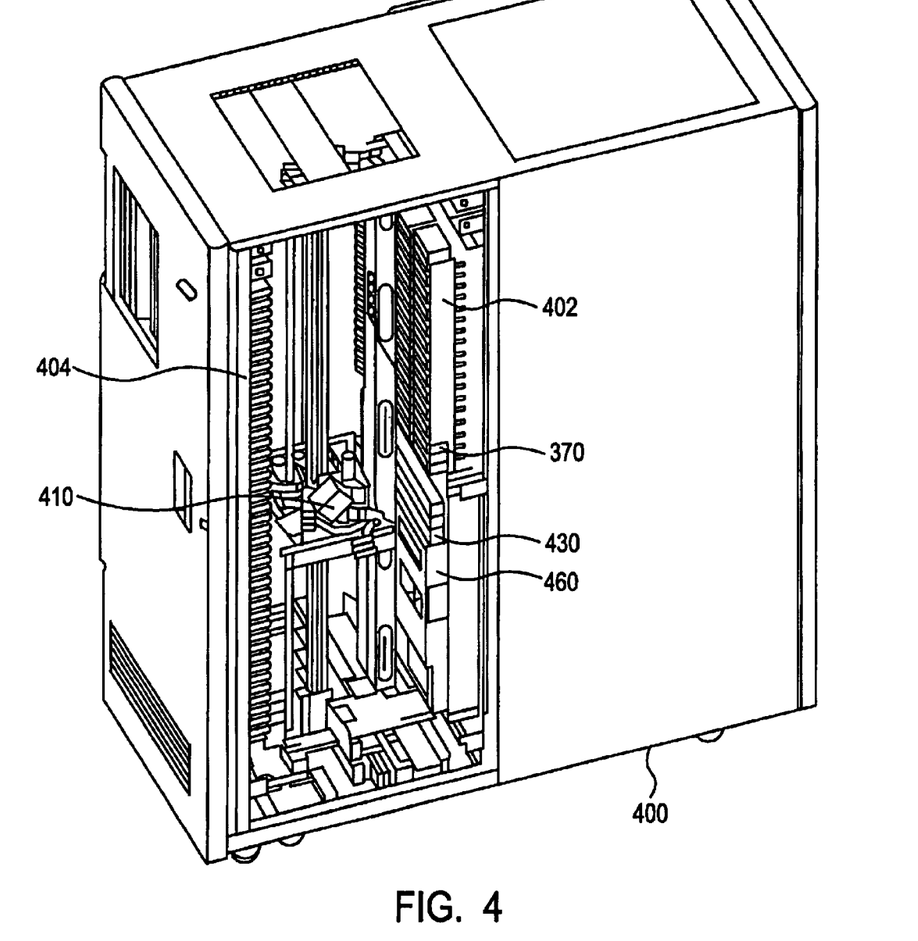
FIG. 4 is a perspective view of a second embodiment of Applicants' data storage and retrieval system.

Referring now to FIG. 2A, data storage device 130 includes device controller 232. Controller 232 includes microprocessor 234 in communication with memory 236. In certain embodiments, microprocessor 234 communicates with memory 236 via communication link 235. In other embodiments, memory 236 is integral to microprocessor 234. Device microcode 238 is stored in memory 236. Device microcode comprises a computer program product which controls the operation of a data storage device, such as data storage device 130 (FIG. 1)/140 (FIG. 1)/430 (FIG. 4).

Referring again to FIG. 1, in certain embodiments, library controller 160 is integral with host 390. In other embodiments, controller 160 is external to host 390. In those external embodiments, library controller 160 (FIG. 1) communicates with host computer 390 (FIGS. 1, 3) via communication link 392.

Figure 2B:
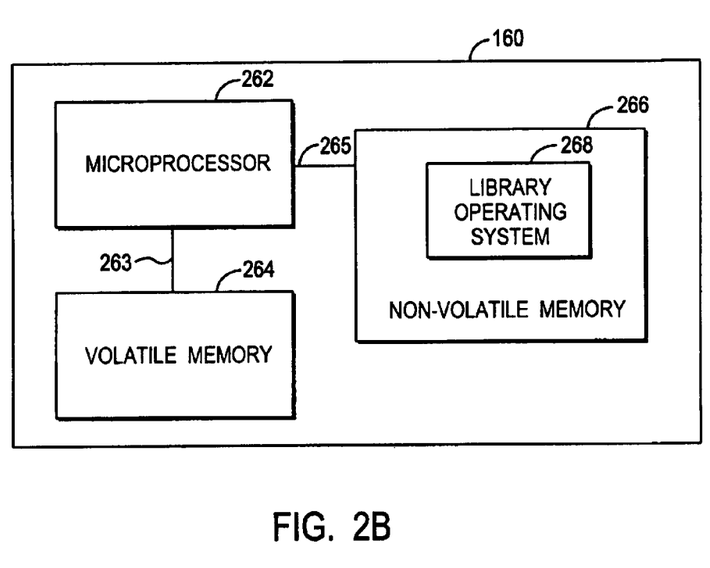
FIG. 2B is a block diagram of a controller disposed in Applicants' data storage and retrieval system.

Referring now to FIG. 2B, library controller 160 includes microprocessor 262, volatile memory 264, and non-volatile memory 266. In certain embodiments, microprocessor communicates with volatile memory 264 via communication link 263. In other embodiments, volatile memory 264 is integral to microprocessor 262. Microprocessor 262 communicates with non-volatile memory 266 via communication link 265. Library operating system 268 is stored in non-volatile memory 266. Operating system 268 comprises a computer program product which controls the operation of data storage and retrieval systems 100 (FIG. 1)/400 (FIG. 4), and tape subsystem 320 (FIG. 3).

Referring again to FIG. 1, operator input station 150 permits a user to communicate with Applicant's automated data storage and retrieval system 100. Devices 180 and 190 each comprise information buffers. In certain embodiments, devices 180 and/or 190 comprise a Direct Access Storage Device ("DASD") cache. In certain embodiments DASD cache 180 and 190 comprise a plurality of hard disk drives which are configured into one or more RAID arrays. In certain embodiments, information transferred between host computer 390 and data storage and retrieval system 100 is buffered in DASD caches 180 and 190 before being recorded on other data storage media, such as one or more magnetic tapes. Import/export station 172 includes access door 174 pivotably attached to the side of system 100. Portable data storage cartridges can be placed in the system, or in the alternative, removed from the system, via station 172/access door 174.

FIG. 4 shows system 400 which comprises another embodiment of Applicant's data storage and retrieval system. System 400 includes first storage wall 402 and second storage wall 404. Storage walls 402 and 404 each include a plurality of storage elements in which can be stored a plurality of portable data storage cartridges. System 400 includes one or more data storage devices, such as device 430. Device 430 comprises a floppy disk drive, an optical disk drive, a magnetic tape drive, and the like. System 400 further includes operator control panel 450 (not shown in FIG. 3).

System 400 further includes library controller 460. Library controller 460 controls the operation of assessor 410 and data storage device 430. Controller 460 is configured similarly to controller 160 shown in FIG. 2B. System 400 further includes one or a plurality of portable data storage cartridges, such as tape cartridges 370. Each cartridge contains a data storage media internally disposed therein, such as data storage media 360 (FIG. 3).

Referring again to FIG. 3, tape subsystem 320, such as data storage and retrieval system 100/200, receives commands from the HSM program 310 in the host system 390 and performs the operations requested by the HSM program 310, such as migration and recall, to transfer data between the host system 390 and the components managed by the tape subsystem 320. In preferred embodiments, the tape subsystem 320 can simultaneously process numerous input/output requests from the host system 390 and any other attached system directed toward the tape drives 330/340 and tape cartridges 370 managed by the tape subsystem 320. Moreover, in certain embodiments HSM program 310 in the host system 390 is capable of multi-tasking, simultaneously executing numerous input/output operations, and simultaneously transmitting multiple I/O requests to the tape subsystem 320 to execute.

In further embodiments, a plurality of host systems 390 may communicate with the tape subsystem 320 and/or a host system 390 may communicate and transfer data to a plurality of tape subsystems 320, each subsystem providing access to a library of tape cartridges.

Figure 5:
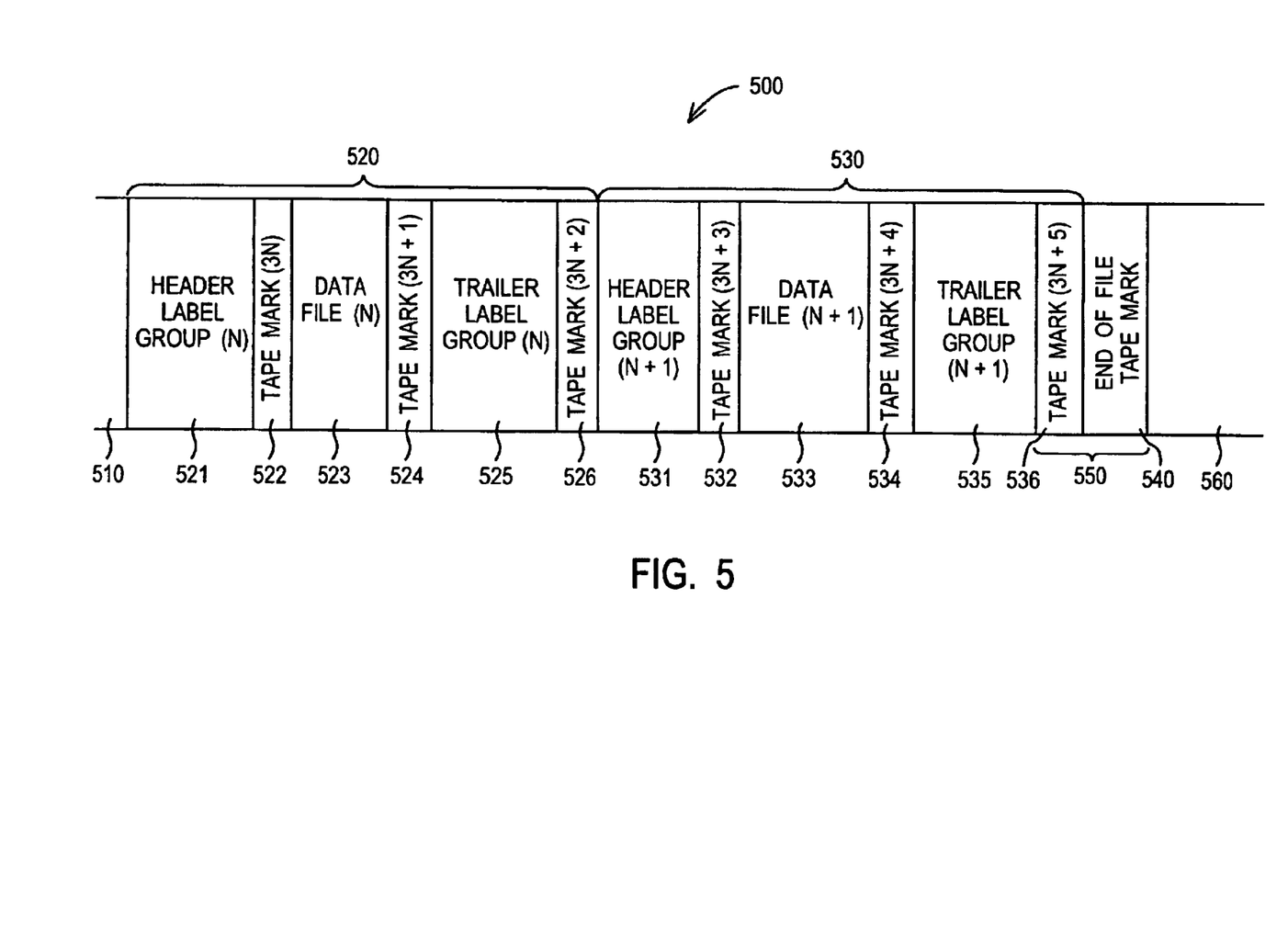
FIG. 5 is a block diagram showing the disposition of information disposed on a data storage tape medium.

FIG. 5 shows a block diagram depicting an industry-standard image of information stored on a data storage medium, such as a portion of magnetic tape 500. The information written on tape 500 includes file 520 and file 530. File 520 is the (N)th file stored on tape 500 and file 530 is the (N+1)th file stored on tape 500. Files 1 through (N−1) are stored on portion 510 of tape 500.

File 520 includes header label group 521, data 523, and trailer label group 525. Tape mark 522 is disposed between header label group 521 and data 523. Tape mark 524 is disposed between data 523 and trailer label group 525. Tape mark 526 is disposed after trailer label group 525. Thus, file 520 includes three (3) tape marks, i.e. tape marks 522, 524, and 526.

File 530 includes header label group 531, data 533, and trailer label group 535. Tape mark 532 is disposed between header label group 531 and data 533. Tape mark 534 is disposed between data 533 and trailer label group 535. Tape mark 536 is disposed after trailer label group 535. Thus, file 530 includes three (3) tape marks, i.e. tape marks 532, 534, and 536.

Tape mark 540 is disposed after tape mark 536. Tape mark 536 in combination with tape mark 540 comprises double tape mark 550. Double tape mark 550 signifies that file 530 is the last file written on tape 500. Thus, portion 560 of tape 500 contains no information.

Figure 6A:
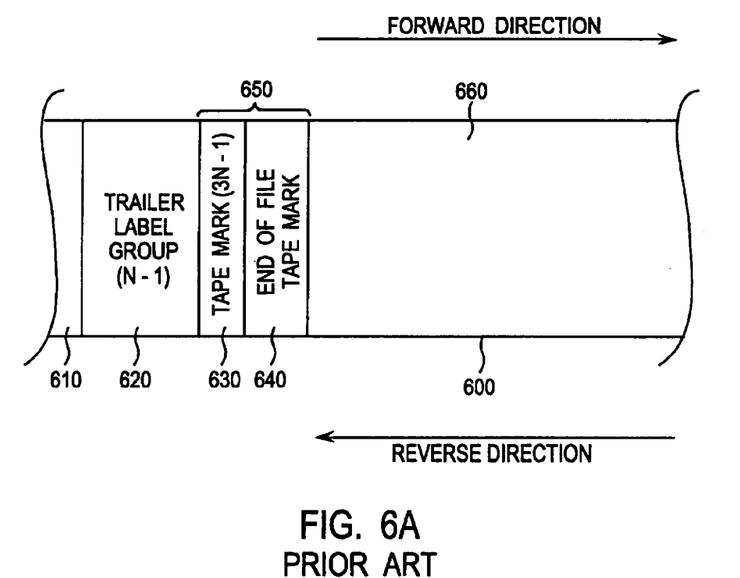
FIG. 6A is a block diagram showing certain steps of a prior art method to write information to a data storage tape medium.
Figure 6B:
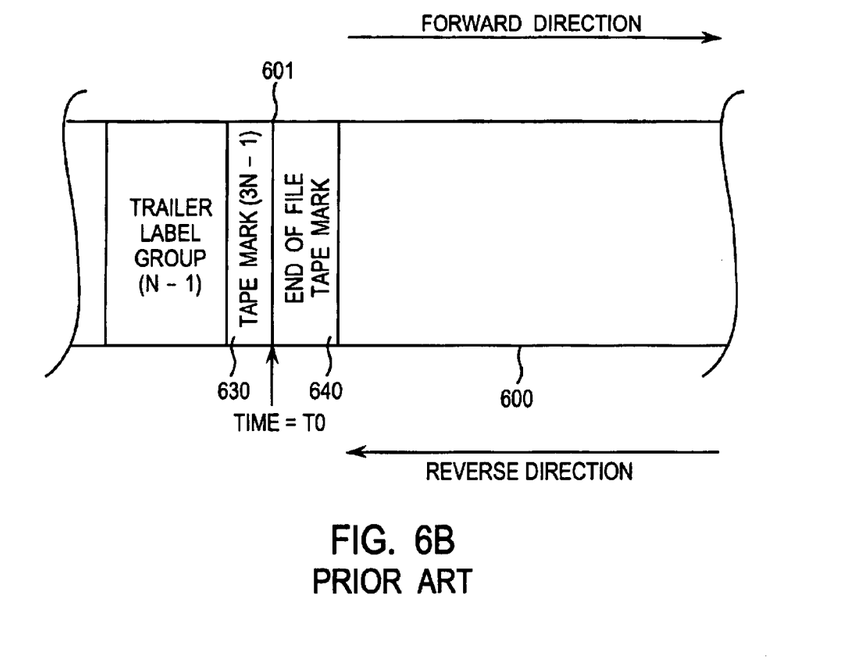
FIG. 6B is a block diagram showing certain steps of a prior art method to write information to a data storage tape medium.

FIGS. 6A–6E, 8, and 9, illustrate prior art methods to write information to tape 600. Referring to FIG. 6A, tape 600 includes (N−1) files. The (N−1)th file ends with trailer label group 620 followed by tape mark 630 and end of file tape mark 640. Tape mark 630 in combination with tape mark 640 comprises double tape mark 650. As noted above, double tape mark 650 identifies the end of information stored on tape 600. Thus, no files are stored on portion 660 of tape 600.

In step 810 (FIG. 8), an attached host computer, such as host computer 390 (FIG. 3), instructs a data storage device, such as data storage device 130 (FIG. 1), to write new information on a designated data storage medium, such as tape 600. In step 820 a robotic accessor, such as accessor 110 (FIG. 1), retrieves and transports the portable data storage cartridge housing tape 600. In step 830, that portable data storage cartridge is inserted, i.e. mounted, in data storage device 130.

In step 840, data storage device 130 advances tape 600 in either the forward or the reverse direction as needed until double tape mark 650 is found. As those skilled in the art will appreciate, data storage device 130 includes read/write head 132 (not shown in FIGs.) internally disposed therein. Upon locating double tape mark 650, the movement of tape 600 is stopped. In step 850, a Back Space File command ("BSF") command is issued to tape drive 130 and tape 600 is moved to position read/write head 132 between tape mark 630 and tape mark 640, i.e. to about position 601 which is shown on FIG. 6B. Read/write head 132 is positioned at about point 601 on tape 600 at time $T_0$.

Figure 6C:
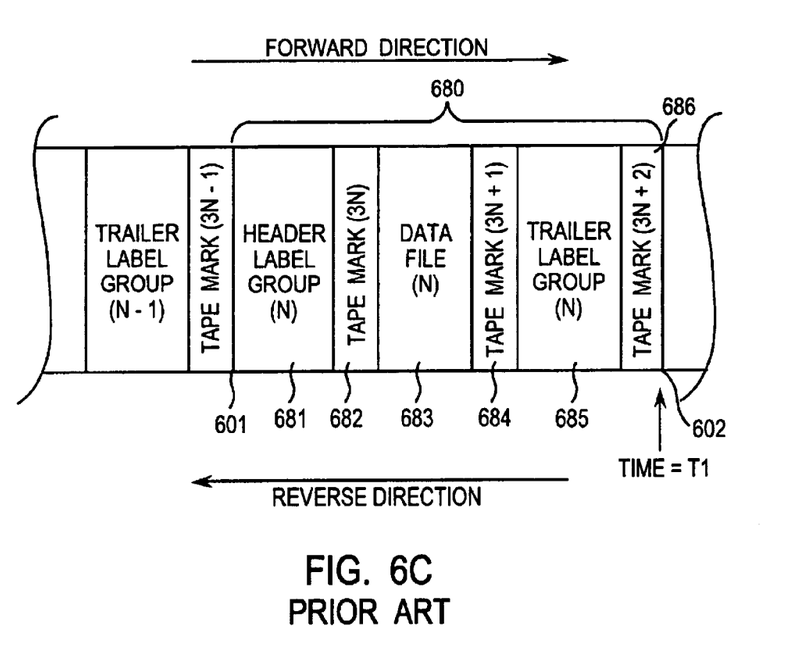
FIG. 6C is a block diagram showing certain steps of a prior art method to write information to a data storage tape medium.
Figure 9:
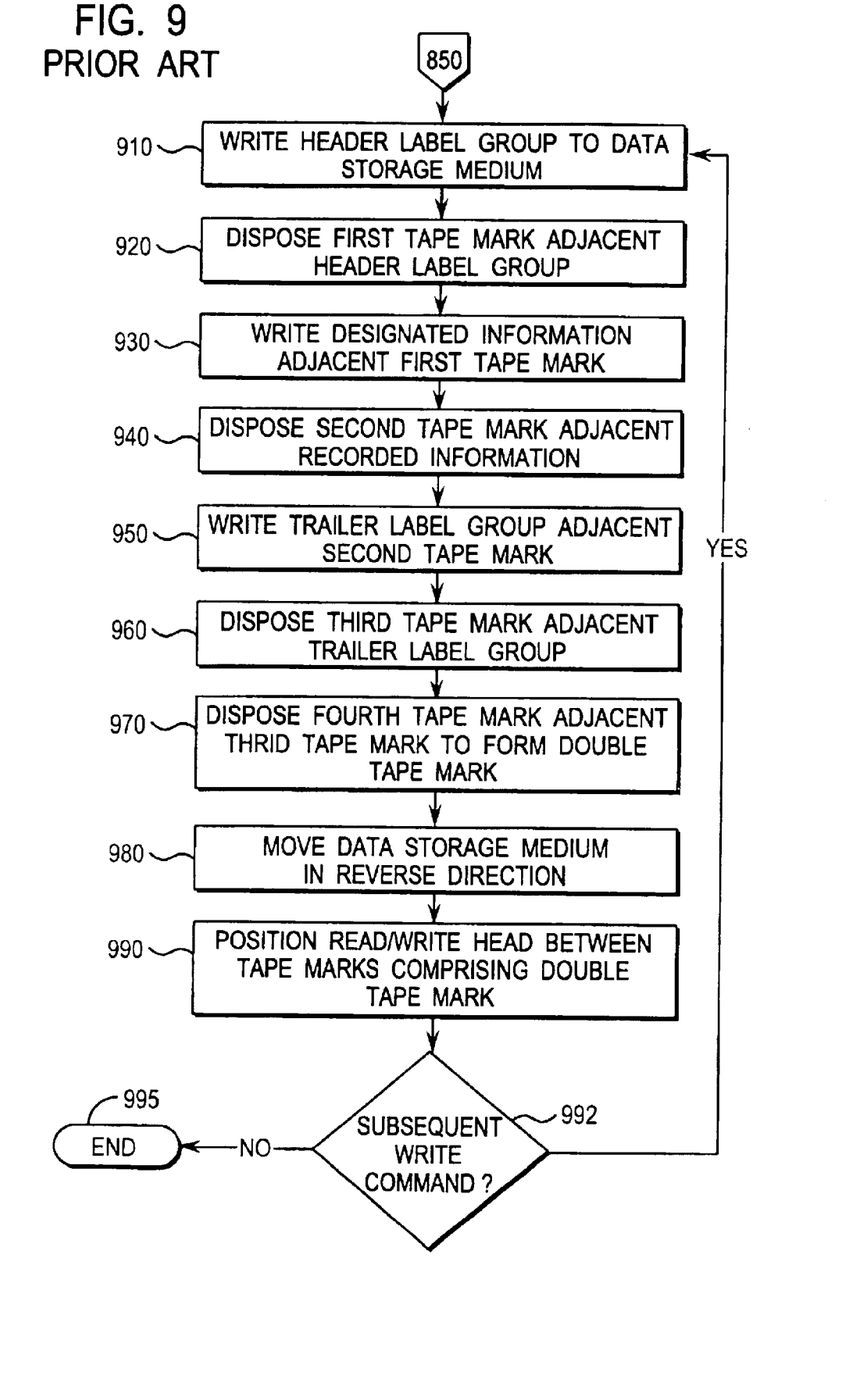
FIG. 9 is a flowchart summarizing the steps of prior art methods to write information to a data storage tape medium.

FIG. 9 summarizes the prior art method to write file 680 to tape 600 starting at about point 601. Referring now to FIGS. 6C and 9, in step 910 header label group 681 is written to tape 600 starting at about position 601. After header label group 681 is written to tape 600, in step 920 tape mark 682 is written to tape 600 adjacent header label group 681. After writing tape mark 682 to tape 600, in step 930 data 683 is written to tape 600 adjacent tape mark 682. In step 940 tape mark 684 is written to tape 600 adjacent data 683. In step 950 trailer label group 685 is written to tape 600 adjacent tape mark 684. In step 960 tape mark 686 is written to tape 600 adjacent trailer label group 685. In step 970 tape mark 687 is written to tape 600 adjacent tape mark 686 to form double tape mark 690.

Figure 6D:
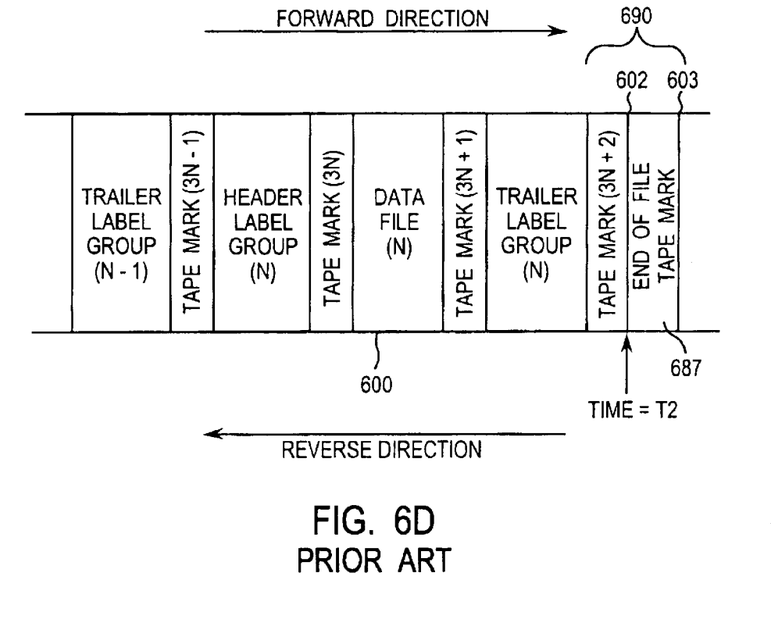
FIG. 6D is a block diagram showing certain steps of a prior art method to write information to a data storage tape medium.

After writing header label group 681, tape mark 682, data 683, tape mark 684, trailer label group 685 and tape mark 686, at time $T_1$ read/write head 132 is positioned at about point 602 of tape 600. Those skilled in the art will appreciate that the time period between $T_0$ and $T_1$, $\Delta T_{Information\ Write}$, represents the time required to write file 680 to tape 600. Thereafter, an end of file ("EOF") tape mark 687 is written adjacent tape mark 687 to form double tape mark 690. Referring now to FIG. 6D, at time $T_2$ read/write head 132 is disposed adjacent point 603.

Figure 6E:
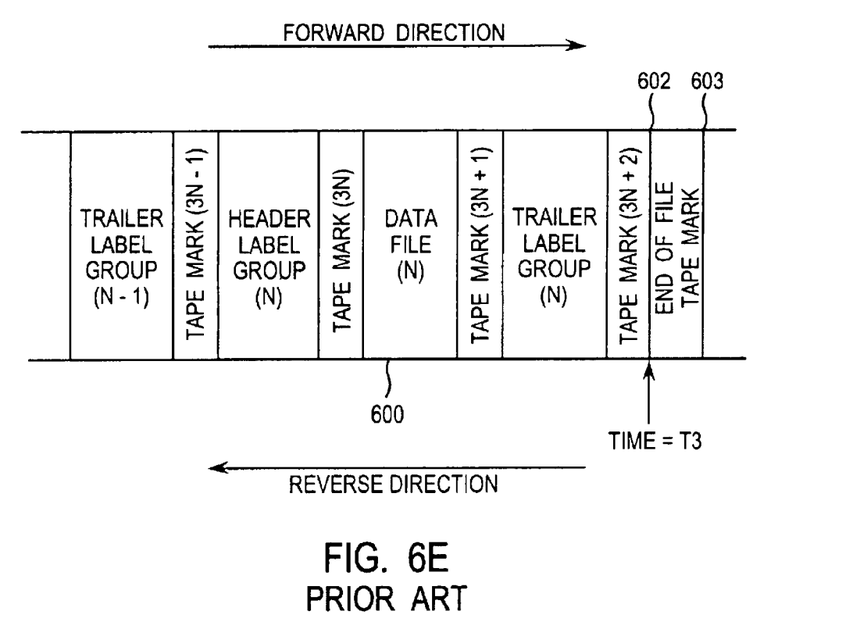
FIG. 6E is a block diagram showing certain steps of a prior art method to write information to a data storage tape medium.

In step 980 a Back Space File command is issued which causes tape 600 to move in the reverse direction such that read/write head 132 is positioned between tape marks 686 and 687. Referring to FIG. 6E, in step 990 the tape is repositioned such that read/write head 132 is disposed at time $T_3$ adjacent point 602 on tape 600. Those skilled in the art will appreciate that the time interval between time $T_1$ and time $T_3$, i.e. $\Delta T_{Head\ Reposition}$, represents the time required to write a double tape mark and reposition tape 600 such read/write head 132 is disposed adjacent point 602.

Using this prior art method, after writing each incremental file to tape 600 a double tape mark is first written, and then overwritten. The time to write/overwrite such a double tape mark includes three segments: (i) the time to synchronize buffered data to the data storage medium, (ii) the time to physically write the EOF tape mark, and (iii) the time to reposition the tape to dispose the read/write head between the two tape marks comprising the EOF double tape mark.

Applicants' method utilizing buffered tape marks eliminates temporal components (i), (ii), and (iii). Thus, when writing (N) files to a data storage medium, Applicants' method eliminates the need to synchronize buffered data to the medium (N) times, eliminates the need to write an EOF tape mark (N) times, and eliminates the need to reverse the direction of travel of the storage medium (N) times.

Applicants' invention comprises a data management system, apparatus, and method to write "buffered" tape marks to a data storage medium. As shown in FIG. 5, standard tape labeling protocols include writing a header label group, such as header label group 521, a first tape mark, such as tape mark 522, information, such as data 523, a second tape mark, such as tape mark 524, a trailer label group, such as trailer label group 525, and a third tape mark, such as tape mark 526. Thus, a typical "file" recorded on a data storage tape medium includes three tape marks disposed adjacent other file components.

As noted above, host computer 390 (FIG. 3) provides information to tape subsystem 320 (FIG. 3), such as library 100/400. In certain embodiments of Applicants' method, the information provided by host 390 is first stored in information buffers, such as DASD devices 180 (FIG. 1)/190 (FIG. 1). The library controller, such as controller 160 (FIG. 1)/460 (FIG. 4) then transfers this information from the buffer to data storage media, such as tape 500 (FIG. 5). In certain embodiments, the library operating system, such as operating system 268 (FIG. 2B), and/or device microcode disposed in the data storage device, such as device microcode 238 (FIG. 2A), interposes the requisite tape marks to the information provided by host computer 390.

Certain applications running on host computer 390 (FIG. 3), however, are capable of properly interposing tape marks between the other file components to create the requisite file image recorded on the data storage medium. Applicants' invention includes a data management system, apparatus, and method to utilize buffered tape marks. Using Applicants' invention, a host computer application capable of properly interposing tape marks and data provides both tape marks and information to the data library, such as library 100/400. The data library operating system, such as operating system 268, stores that information/multiple tape mark combination in the data library's buffers, such as DASD devices 180 (FIG. 1)/190 (FIG. 1), before writing the information and tape marks to a data storage medium, such as tape 500.

Applications running on host computer 390 which are capable of properly interposing tape marks and data include some sort of application programming interface ("API") which describes the attributes of the data set, i.e. the file, to be recorded on a data storage medium. In certain embodiments of Applicants' method, this API comprises a Dataset Control Block ("DCB"). Such a DCB further comprises a Dataset Control Block Extension ("DCBE") which includes parameters which can be manipulated independently of the application itself. Moreover, such a DCBE is dynamically changeable by the application at the dataset level.

In certain embodiments, the DCBE includes a DCBE-FLG3 attribute, a DCBESYN_NONE attribute, a SYNC=NONE command, and a SYNC=SYSTEM command. The DCBEFLG3 attribute includes a 3 bit field comprising the DCBESYN_NONE attribute. In the event the host application invokes the SYNC=NONE command, then the operating system, such as operating system 168, sets the DCBESYN_NONE attribute to "ON," thereby enabling the use of buffered tape marks. In the event host application invokes the SYNC=SYSTEM command, then the operating system sets the DCBESYN_NONE attribute to "OFF," thereby disallowing the use of buffered tape marks.

Figure 7:
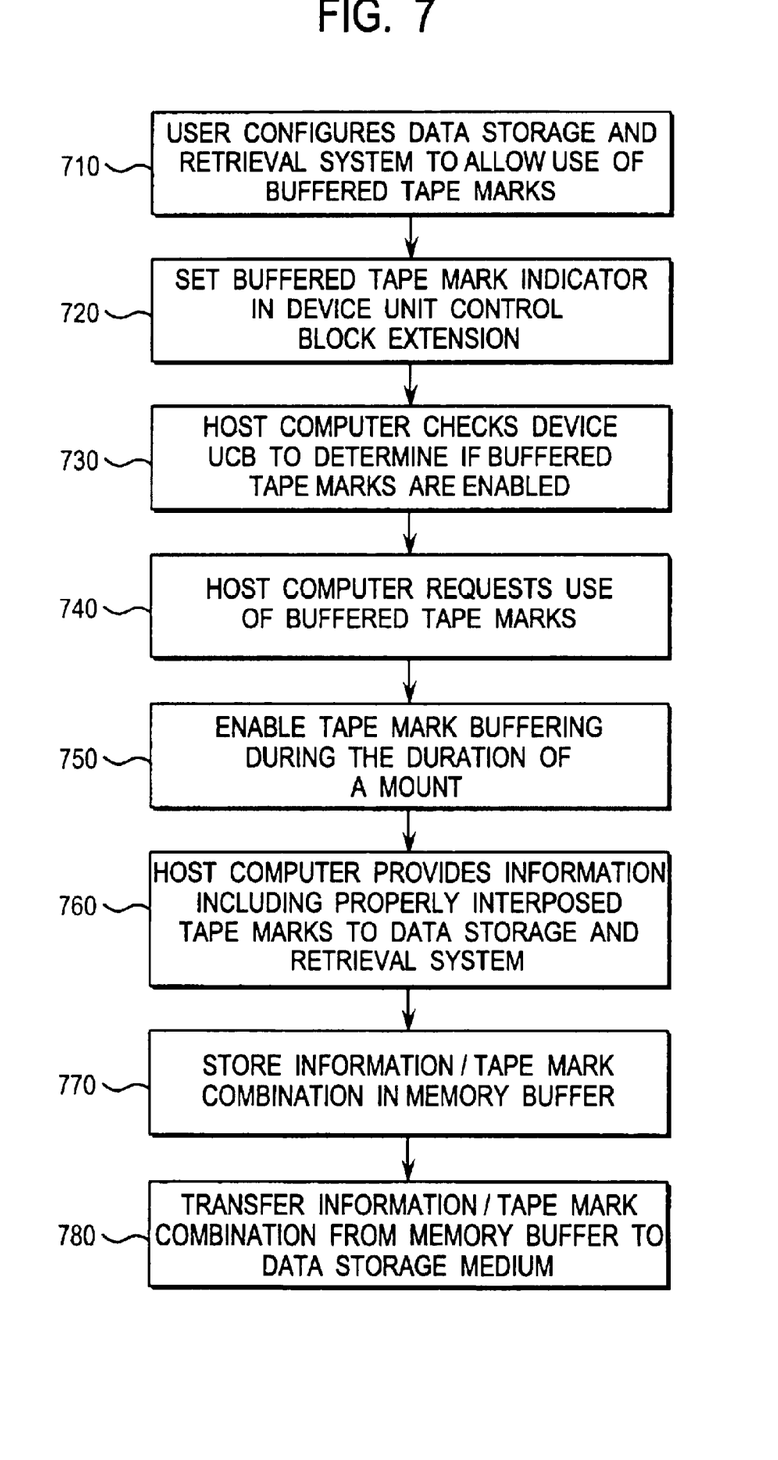
FIG. 7 is a flowchart summarizing Applicants' method to use buffered tape marks.
Figure 8:
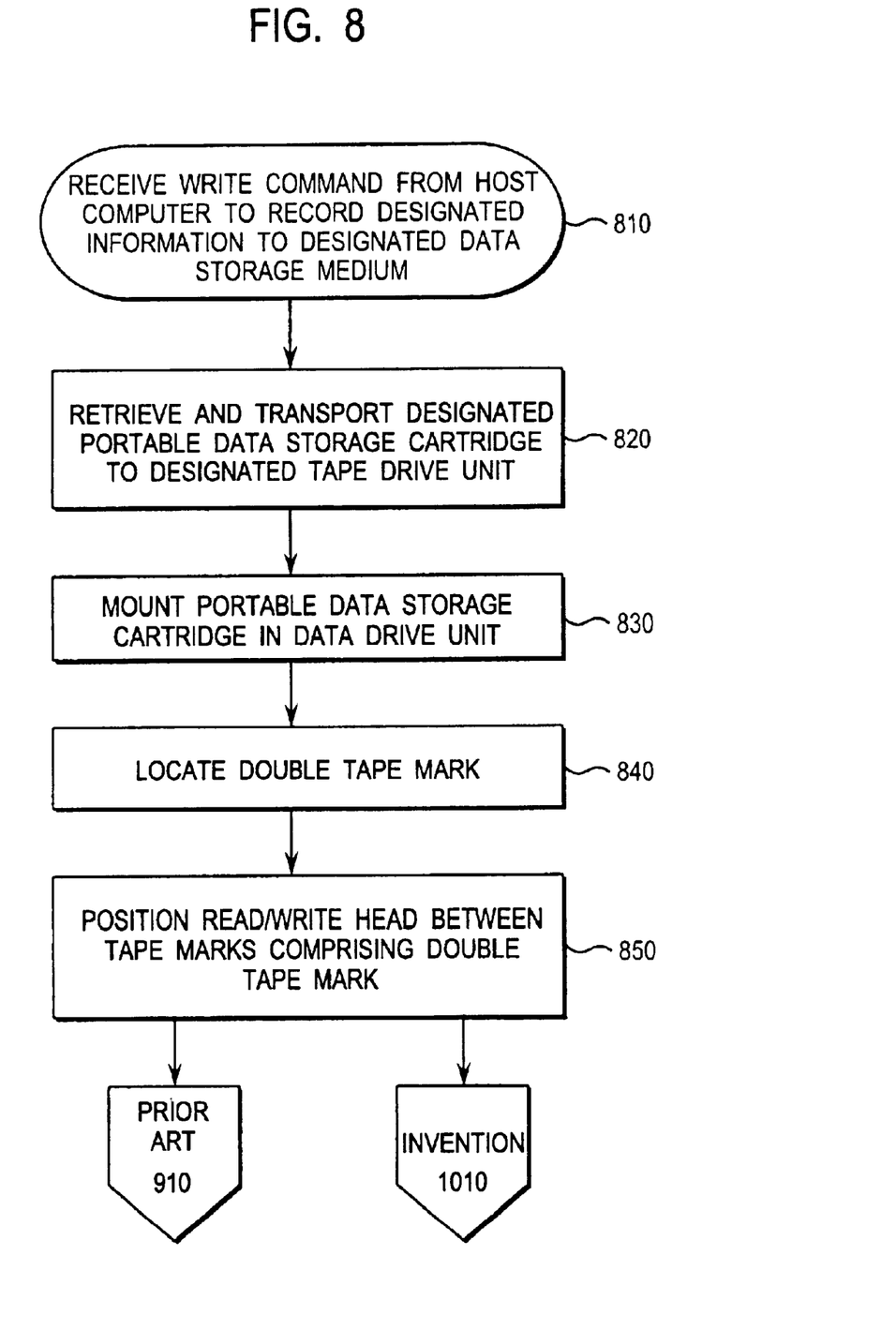
FIG. 8 is a flowchart summarizing the initial steps in Applicants' method to write information to a data storage tape medium.

FIG. 7 summarizes Applicants' method to utilize buffered tape marks when recording information to a data storage medium. In step 710, a user configures the data storage and retrieval system to allow use of buffered tape marks.

When a data storage device disposed in Applicants' data storage and retrieval system is allocated to write designated information on a designated data storage medium, in step 720 the operating system determines, among other things, if the host application providing the designated information has requested use of buffered tape marks. In the event the DCBESYN_NONE attribute is set to "ON," then in step 1220 the library operating system sets a buffered tape mark indicator in that data storage device's unit control block extension ("UCB extension"). In certain embodiments, the buffered tape mark indicator comprises a UCBCX_BUFFTM attribute. If the operating system determines that use of buffered tape marks is enabled, then the operating system sets the UCBCX_BUFFTM indicator to "ON."

In step 730 the host computer application checks the allocated data storage device's UCB extension to determine if buffered tape marks are enabled. In step 1240 the application requests the operating system use buffered tape marks when recording certain designated information to a designated data storage medium. In step 1250, the operating system issues a MODE SET command to enable use of buffered tape marks. In certain embodiments, the data library operating system includes a MODE SET command. In these embodiments, the operating system issues a MODE SET command to persistently enable tape mark buffering for that designated information.

In step 760 the host computer application provides information which includes properly interposed tape marks to the data storage and retrieval system, such as data storage and retrieval system 100/400. The information provided by the host computer comprises one or a plurality of data files, where each such data file includes, in the following order: a header label group, a first tape mark, data, a second tape mark, a trailer label group, and a third tape mark.

In step 770 the data storage and retrieval system stores that provided data files/tape mark combination in a memory buffer, such as DASD device 180 (FIG. 1)/190 (FIG. 1). In step 780, the data storage and retrieval system transfers the provided data files/tape mark combination to a designated data storage medium, such as tape 500 (FIG. 5) using a designated data storage device, such as device 130 (FIG. 1)/140 (FIG. 1)/430 (FIG. 4).

Applicants' invention includes a data storage device comprising a computer useable medium having computer readable program code disposed therein for implementing Applicants' method to record information on a data storage medium. Applicants' invention further includes a data storage and retrieval system comprising a computer useable medium having computer readable program code disposed therein for implementing Applicants' method to record information on a data storage medium removeably disposed a data storage device disposed within Applicants' data storage and retrieval system. Applicants' invention further includes computer program products embodied as program code stored in one or more storage device, such as a magnetic disk, a magnetic tape, or other non-volatile memory device disposed, for example, in a host computer, a data storage device, or a library controller.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to record information on a data storage medium using buffered tape marks, comprising the steps of:

providing a data storage and retrieval system comprising a host computer, one or more memory buffers, an operating system, and a data storage device;

configuring said data storage and retrieval system to allow use of buffered tape marks;

providing information from said host, wherein said information includes one or more tape marks;

providing a Dataset Control Block along with said information;

setting a buffered tape mark indicator in said Dataset Control Block to request use of buffered tape marks;

storing said information in said one or more memory buffers;

removeably disposing said data storage medium in said data storage device; and transferring said information from said one or more memory buffers to said data storage medium.

2. The method of claim 1, wherein said Dataset Control Block comprises a Dataset Control Block extension which includes a DCBESYN_NONE attribute and a SYNC=NONE command, said method further comprising the steps of:

issuing said SYNC=NONE command; and setting said DCBESYN_NONE attribute to ON.

3. The method of claim 1, wherein said operating system comprises a Unit Control Block extension, wherein said unit control block extension comprises a UCBCX_BUFFTM attribute, said method further comprising the step of setting said UCBCX_BUFFTM attribute to ON.

4. A data storage and retrieval system comprising a computer useable medium having computer readable program code disposed therein for recording information using buffered tape marks, wherein said data storage and retrieval system comprises a host computer, one or more memory buffers, an operating system, a data storage device, and a data storage medium removeably disposed in said data storage device, the computer readable program code comprising a series of computer readable program steps to effect:

configuring said data storage and retrieval system to allow use of buffered tape marks;

providing information from said host computer, wherein said information comprises one or more tape marks;

providing a Dataset Control Block along with said information;

setting a buffered tape mark indicator in said Dataset Control Block to request use of buffered tape marks;

storing said information in said one or more memory buffers: and transferring said information from said one or more memory buffers to said data storage medium.

5. The data storage and retrieval system of claim 4, wherein said Dataset Control Block comprises a Dataset Control Block extension which includes a DCBESYN_NONE attribute and a SYNC=NONE command, wherein said computer readable program code further comprises a series of computer readable program steps to effect:

issuing said SYNC=NONE command; and setting said DCBESYN_NONE attribute to ON.

6. The data storage and retrieval system of claim 4, wherein said operating system includes a Unit Control Block extension comprising a UCBCX_BUFFTM attribute, wherein said computer readable program code further comprises a series of computer readable program steps to effect setting said UCBCX_BUFFTM attribute to ON.

7. The data storage and retrieval system of claim 6, wherein said operating system comprises a MODE SET command, wherein said computer readable program code further comprises a series of computer readable program steps to effect issuing said MODE SET to enable tape mark buffering.

8. A computer program product usable with a programmable computer processor having computer readable program code embodied therein for recording information using buffered tape marks, comprising:

a DCBESYN_NONE attribute;

a SYNC=NONE command;

computer readable program code which causes said programmable computer processor to issue said SYNC=NONE command; and computer readable program code which causes said programmable computer processor to set said DCBESYN_NONE attribute to ON;

computer readable program code which causes said programmable computer processor to configure said data storage and retrieval system to allow use of buffered tape marks;

computer readable program code which causes said programmable computer processor to provide information, wherein said information comprises one or more tape marks;

computer readable program code which causes said programmable computer processor to store said information in a memory buffer; and computer readable program code which causes said programmable computer processor to transfer said information from said memory buffer to a data storage medium.

9. The computer program product of claim 8, further comprising:

a UCBCX_BUFFTM attribute;

computer readable program code which causes said programmable computer processor to set said UCBCX_BUFFTM attribute to ON.

* * * * *